Jan. 25, 1944. F. S. BLOOM 2,339,753
LIQUID CONTROL APPARATUS
Filed April 10, 1942 2 Sheets-Sheet 1

INVENTOR
Frederick S. Bloom
by his attorneys
Stebbins and Blenko

Jan. 25, 1944.                F. S. BLOOM                2,339,753
                         LIQUID CONTROL APPARATUS
                          Filed April 10, 1942           2 Sheets-Sheet 2

INVENTOR
Frederick S. Bloom
by his attorneys
Stebbins and Blenko

Patented Jan. 25, 1944

2,339,753

UNITED STATES PATENT OFFICE 2,339,753

LIQUID CONTROL APPARATUS

Frederick S. Bloom, Pittsburgh, Pa.

Application April 10, 1942, Serial No. 438,402

3 Claims. (Cl. 50—23)

This invention relates to apparatus for controlling the flow of liquid and, in particular, to pressure-control apparatus such as regulators or pressure-reducing valves and the like.

In systems for supplying liquid or gas to a point of consumption, from a source which is subject to variable conditions, it is common to utilize a pressure-reducing valve or regulator. The function of the regulator, of course, is to maintain a constant pressure at the point of consumption, regardless of variations of pressure in the supply line. Such pressure-reducing valves or regulators function very satisfactorily for gases and most liquids. Usually the regulators are of the diaphragm type, and a dead-end connection is usually made from the downstream side of the regulator to apply pressure to one surface of the diaphragm whereby any tendency of the pressure on the downstream side to vary, immediately reacts on the diaphragm to correct itself.

Certain fluids largely used in industry have characteristics which prevent the proper functioning of a regulator as described above. Numerous industrial furnace installations, for example, are fired with tar or heavy oil. These fuels must be heated to temperatures of from 180° to 300° F. in order to maintain them sufficiently fluid to flow through the supply pipe and the burner nozzle. Although numerous attempts have been made to utilize the conventional regulator arrangement on a line supplying this type of fuel, experience shows that the liquid in the dead-end connection from the downstream side of the regulator to one side of the diaphragm thereof, cools after a short period of operation to such an extent that its viscosity is materially increased. As a result, the reaction of variations of pressure on the downstream side of the regulator is not transmitted immediately and accurately to the regulator diaphragm. Because of the sluggish action due to increased viscosity of the liquid, considerable variations in the pressure on the downstream side of the regulator may take place without correction and the end result is that the regulator does not function properly to maintain the desired constancy of pressure on the downstream side thereof.

I have invented a novel pressure regulator which overcomes the aforementioned difficulty and serves to maintain the desired constant pressure in supply lines handling liquids which have to be heated in order to flow readily. In a preferred embodiment of the invention, I provide a regulator having means directly actuated by the pressure of the liquid as it flows through the supply line, for controlling the regulator valve. The simplest form of the invention includes a chamber through which the liquid flows on the way to the consuming device and a yieldable surface such as a diaphragm or bellows therein responsive to the pressure on the downstream side and effective to control a valve in the line supplying liquid to the chamber. With such provisions, the liquid which exerts the pressure on the control surface is constantly circulating through the chamber, and any chilling thereof with the resultant increase in viscosity is prevented.

One important application of the invention is the maintenance of a constant flow of liquid. For this application I utilize a differential regulator subject to the pressures on opposite sides of an orifice, and thus take advantage of the principle that the flow through an orifice is proportional to the difference between the pressures on opposite sides thereof. In one form of this application, I provide a regulator of the diaphragm type having a high-pressure chamber and a low-pressure chamber separated by a diaphragm. A valve located in the high-pressure chamber is controlled by the diaphragm and an adjustable spring is provided, bearing on the diaphragm, to maintain the proper differential between the pressures in the two chambers. A control valve is connected on the downstream side of the regulator. The exit side of this valve is connected to the low-pressure chamber of the regulator and the liquid supply for the burner or other consumption device is tapped from the low-pressure chamber. By virtue of this arrangement, the heated liquid passes through the regulator valve and exerts the pressure under which it is supplied on the high-pressure side of the regulator diaphragm, then passes through the control valve and through the low-pressure chamber where it exerts its pressure on the other side of the diaphragm. The liquid then flows on to the burner. The liquid in the low-pressure chamber is thus continuously circulating, being constantly replaced by fresh, heated liquid so that it does not have an opportunity to cool and increase its viscosity.

Instead of the diaphragm regulator, I may employ a device having collapsible bellows as the pressure-responsive element.

A complete understanding of the invention may be gained from the following detailed description in connection with the accompanying drawings illustrating the preferred embodiments outlined above.

Figure 1:
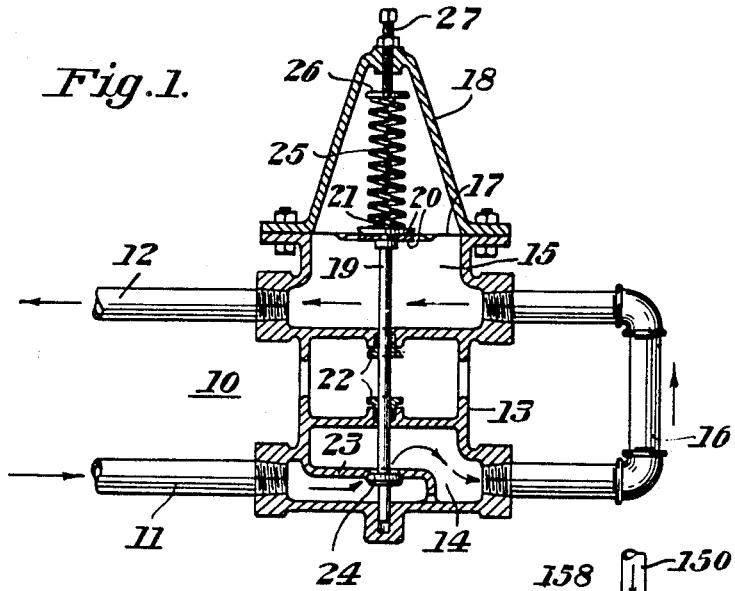
Figure 1 is a vertical section through a regulator constructed in accordance with my invention.

Referring now in detail to the drawings. A regulator 10 has a supply connection 11 to a source of heated liquid such as tar or heavy oil and a delivery connection 12 to a consuming device such as a burner. The supply of heated liquid may be of any suitable character, e. g., a storage tank having a steam coil or other appropriate heating means therein.

The regulator 10 includes a body 13 having a valve chamber 14 formed in the lower portion thereof and a diaphragm chamber 15 in the upper portion. The supply connection 11 is threaded into one side of the valve chamber and the delivery connection 12 into one side of the diaphragm chamber. A pipe connection 16 establishes communication between the other sides of the valve and diaphragm chambers.

A diaphragm 17 extends across the open top of a chamber 15 being held thereon by a dome 18 secured to the chamber by screws or bolts. A valve stem 19 has washers 20 secured thereon by a nut 21 threaded on the reduced upper end of the stem, the washers being disposed on opposite sides of the diaphragm. The stem 19 extends vertically through the valve chamber 14 and diaphragm chamber 15, packing glands 22 being provided to seal the spaces between the stem and chamber walls. The valve chamber 14 has a cross wall 23 with a port therethrough and a seat thereon for a valve disc 24 mounted on the stem.

A compression spring 25 bears on the upper washer 20 and on a washer 26 held in place by an adjusting screw 27 threaded through the top of the dome 18. The screw 27 is adjusted so that the spring 25 tends to hold the valve disc 24 slightly off its seat under normal operating conditions. Under such conditions, an increase of the pressure in the chamber 15 displaces the diaphragm 17 upwardly moving the valve disc 24 to a more nearly closed position. Conversely, a decrease of the pressure in the chamber 15 permits the spring 25 to force the diaphragm downwardly, thereby moving the valve disc 24 to a more fully open position. A substantially constant pressure is thus maintained in the chamber 15 and also in the outlet connection 12. Any change in the downstream pressure is immediately effective upon the diaphragm to change the position of the control valve to correct such variation. Since the liquid in the chamber 15 is constantly being displaced by fresh, heated liquid, there is no opportunity for the chilling thereof and the consequent increase in viscosity which would tend to make the diaphragm action sluggish.

Figure 2:
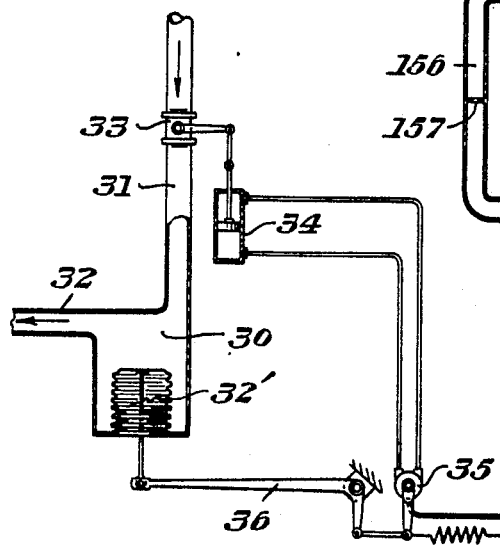
Figure 2 is a diagrammatic view illustrating a modification.

Figure 2 illustrates diagrammatically a somewhat different type of regulator. This type includes a chamber 30 to which a supply pipe 31 and a delivery pipe 32 are connected so that liquid flowing from the pipe 31 to the pipe 32 passes through the chamber. Pressure-responsive means in the form of a collapsible bellows 32' is disposed in the chamber 30 adapted to control a regulating valve 33 connected in the supply pipe 31. The means whereby the bellows controls the valve may be of any suitable type. As an example, I have shown a hydraulic servomotor 34, a control valve 35 therefor and a linkage 36 between the valve 35 and the bellows 32 for operating the latter in accordance with variations in pressure in the chamber 30.

Figure 4:
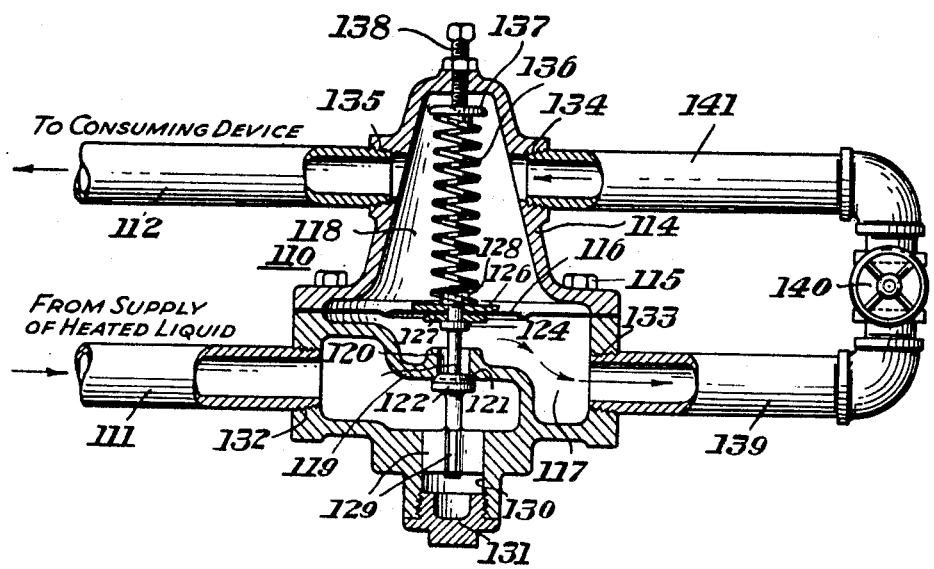
Figure 4 is a section taken along the plane of line IV—IV of Figure 3 with parts in elevation.
Figure 3:
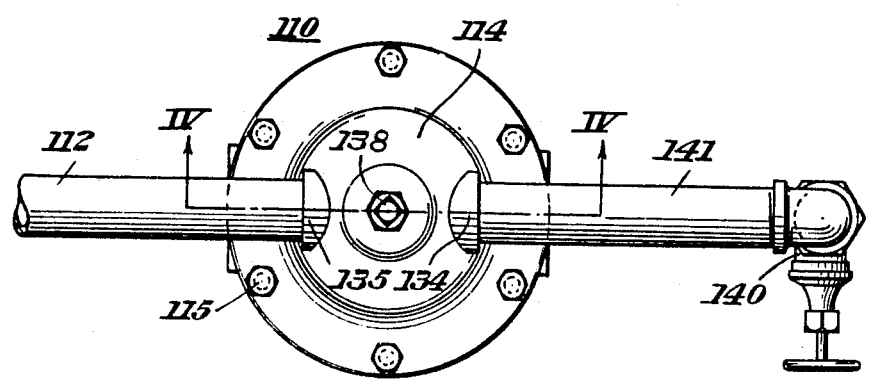
Figure 3 is a plan view of a differential regulator.

My regulator is well adapted to the maintenance of a constant rate of flow. For this application, I employ a differential regulator and a control valve so arranged that the regulator maintains a constant difference of pressure between opposite sides of the control valve, thereby assuring a constant flow, according to the well known principles of hydraulics, for any given orifice determined by the setting of the control valve. One form of the metering system made available by my invention is illustrated in Figures 3 and 4, the regulator itself being designated 110.

The regulator 110 preferably comprises a body including a base and a dome 114 secured thereto by screws 115. A flexible diaphragm 116, the periphery of which is clamped between the base and dome 114, divides the interior of the regulator into a high-pressure chamber 117 and a low-pressure chamber 118. A cross wall 119 in the high-pressure chamber has a vertical bore 120 therethrough, the lower end of which forms a seat 121 for a valve disc 122. The valve disc 122 is mounted on a stem having a shoulder 124 adjacent the upper end. Diaphragm-gripping washers 126 and 127 are clamped between the shoulder 124 and a nut 128 on the extreme upper end of the stem which is threaded. The lower end of the stem has radial guides 129 thereon slidable in a central bore 130 through the bottom of the base. The bore 130 is normally closed by a screw plug 131.

The supply pipe 111 is threaded into an inlet port 132 communicating with the high-pressure chamber 117 on the entering or upstream side of the cross wall 119. Outlet port 133 communicates with the high-pressure chamber 117 on the downstream side of the cross wall. An inlet port 134 and an outlet port 135 communicate with the low-pressure chamber 118 within the dome 114. A compression spring 136 bears on a washer 126 and on a washer 137 disposed centrally in the dome 114 near the top thereof and supported by an adjusting screw 138 threaded through the top of the dome. A pipe connection 139 extends from the outlet port 133 of the high-pressure chamber 117 to a control valve 140. This valve may be of any suitable type and is preferably of the manually operable, variable-orifice type. A pipe connection 141 extends from the valve 140 to the inlet 134 in the low-pressure chamber 118.

The operation of the apparatus will doubtless be apparent from the foregoing description thereof, but will, nevertheless, be reviewed for the sake of completeness.

Heavy oil, tar or other liquid, suitably heated, i. e., to a temperature of from 180° to 300° F., is delivered from the source through the pipe connection 111 to the high-pressure chamber 117 on the entering side of the cross wall 119 therein. The spring 136 is so adjusted as to exert a slight differential pressure sufficient initially to keep the valve disc 122 below its seat 121. The liquid thus flows through the bore 120 in the cross wall and through pipe connection 139 to valve 140. An upward pressure is immediately exerted on the regulator diaphragm 116 depending on degree to which the valve 140 is opened. If the valve 140 is closed, of course, the full line pressure is applied to the diaphragm and thereby moves the valve disc 122 to closed position. If the valve 140 is partly opened the liquid flows through the pipe connection 141 into the low-pressure chamber 118, at reduced pressure by virtue of the pressure drop across the valve 140. The liquid fills the low-pressure chamber 118 and then flows on through the connection 112 to the consuming device. A certain back-pressure is developed in the connections 112 and 141 and in the chamber 118 by the restricted outlets of the burner nozzle. This pressure is exerted on the upper surface of the diaphragm 116. Any variation of this back-pressure has an immediate reaction through the diaphragm 116 on the position of the valve 122.

As will be apparent from the foregoing the liquid control apparatus of my invention is effective to maintain a predetermined differential pressure across a valve orifice. By this means it is possible to obtain a measured flow of liquid, i. e., to maintain the flow at a constant rate despite changes in the downstream pressure, so long as the pressure on the fluid from the source is large enough to overcome any increase in the pressure downstream. The principal advantage of the invention is that a continuous flow of heated liquid is maintained through the low-pressure chamber 118 whereby the fluid therein is always heated to a temperature at which it is highly fluid so that any change in the back pressure is effective immediately to cause the necessary adjustment of the position of the valve disc 122.

It will be understood that the invention, in effect, provides a differential-pressure regulator, the difference between the pressures on opposite sides of the diaphragm being adjustable by means of screw 138. Usually a relatively small differential between the pressures is sufficient to maintain the desired flow through the valve 140 and to the burner or other consuming device.

Figure 5:
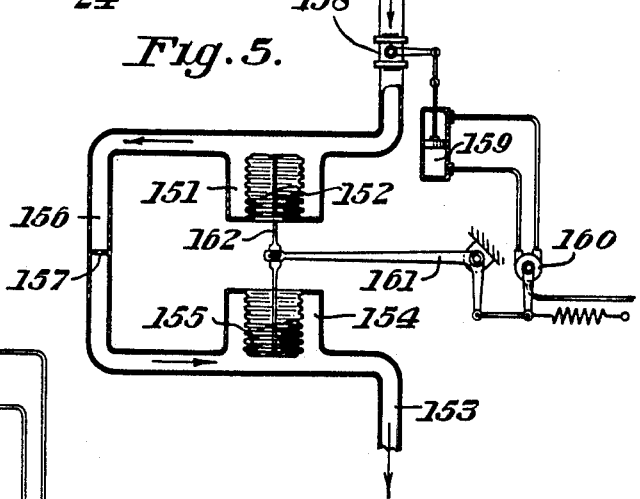
Figure 5 is a diagrammatic view showing a modified differential regulator.

Figure 5 illustrates a modified form of metering or flow-control apparatus embodying my invention. In this form, a supply pipe 150 is connected to a chamber 151 having a collapsible bellows 152 therein and a delivery pipe 153 is connected to a chamber 154 having a collapsible bellows 155 therein. An interconnecting pipe 156 extends from chamber 151 to chamber 154, connections being so made that liquid supplied by pipe 150 passes through the chamber 151, pipe 156 and chamber 154 successively, before flowing on through the delivery pipe 153. The pipe 156 has an orifice 157 therein such as afforded by an orifice plate or a manually operable valve of any suitable type. A regulator valve 158 is connected in the supply pipe 150. A servo-motor 159 is provided to operate the valve 158. The motor 159 has a control valve 160 adapted to be operated by a linkage 161. The linkage 161 is pivoted to a connecting member 162 extending between the bellows 152 and 155. The movement of the member 162, therefore, is determined by the difference between the pressures exerted on the bellows, respectively. Any tendency of this difference to vary from a predetermined setting will cause operation of the linkage 161, the valve 160, the motor 159 and the valve 158, whereby the necessary correction will be applied. The principle underlying the operation of the embodiment shown in Figure 5 is thus the same as that on which the operation of the apparatus shown in Figures 3 and 4 is based.

It will be apparent that my invention is characterized by an important advantage over regulators as heretofore constructed. As previously explained, the liquid which applies the control pressure to operate the regulating valve is maintained substantially at the normal delivery temperature and is not subject to chilling because it is being constantly replaced with fresh heated liquid from the source thereof. My regulator is thus not subject to the sluggish action characterizing previous regulators, as a result of the increased viscosity of the liquid in the impulse line from the downstream side of the regulating valve to the pressure chamber, because of the gradual cooling thereof below the temperature at which the liquid is sufficiently fluid to flow readily.

The invention has special advantages for burner supply lines. In burning liquid fuel, restrictions sometimes develop in the pipe connections because of accumulation of dirt. The back-pressure, furthermore, is frequently subject to considerable variation particularly in installations where a steam jet is utilized to atomize the fuel. This is true even though a constant pressure is maintained on the supply line. As previously indicated, in the forms shown in Figures 4 and 5, the invention provides a metered flow of fuel regardless of variations in the downstream pressure, so long as sufficient pressure is maintained on the upstream side of the regulator.

If desired the valve 140 may be of special type with a pointer and scale, and may be calibrated to indicate the number of gallons of liquid per hour for which the valve is set, for a given drop in pressure across it. This pressure differential, of course, is obtained by proper adjustment of the spring 136 of the regulator, by means of screw 138.

A further advantage of the invention is that the regulating apparatus of my invention is no more costly than the control apparatus previously available and is materially less expensive than other expedients that might be resorted to to overcome the difficulty for which my invention is a complete solution.

Although I have illustrated and described but a preferred embodiment of the invention, it will be recognized that changes in the construction and arrangement thereof may be made without departing from the spirit of the invention or the scope of the appended claims.

I claim:

1. A system of supplying to a consuming device a measured flow of a material such as tar or heavy oil which is fluid only when heated to a temperature substantially above that of the surrounding atmosphere, comprising a source of the material heated to such temperature, a regulator having a cross wall providing a valve seat, a valve adapted to engage said seat, a pipe connection from said source to said regulator on the inlet side of said valve, a yieldable member in said regulator subject on one side to the pressure of the material on the downstream side of the cross wall, means whereby said member is effective under such pressure to close said valve, a connection from a portion of the regulator on said side of said member to a portion of the regulator on the other side of said member, and a pipe connection from said last-mentioned portion to said consuming device whereby the material flowing from said source to said device traverses said last-mentioned portion of the regulator and is thereby prevented, by being constantly replaced, from cooling to a temperature at which it is stiff and viscous, and therefore incapable of immediately reflecting changes of pressure in said last-mentioned pipe connection.

2. A system as defined by claim 1 characterized by a valve in said second-mentioned connection.

3. A system as defined by claim 1 characterized by a spring in said regulator normally tending to unseat said valve.

FREDERICK S. BLOOM.